United States Patent [19]
Covington et al.

[11] Patent Number: 5,556,000
[45] Date of Patent: Sep. 17, 1996

[54] AUTOMATIC AIR HEATING SYSTEM FOR VENDING MACHINES

[75] Inventors: Wayne L. Covington; Steven C. Price, both of Boise, Id.

[73] Assignee: Ore-Ida Foods, Inc., Boise, Id.

[21] Appl. No.: 399,375

[22] Filed: Mar. 6, 1995

Related U.S. Application Data

[63] Continuation of Ser. No. 20,715, Feb. 22, 1993, Pat. No. 5,419,239, which is a continuation-in-part of Ser. No. 855,927, Mar. 24, 1992, Pat. No. 5,203,253, which is a continuation-in-part of Ser. No. 594,382, Oct. 9, 1990, Pat. No. 5,097,754.

[51] Int. Cl.$^6$ .................................................. A24F 27/14
[52] U.S. Cl. ........................... 221/150 A; 222/77; 99/407
[58] Field of Search ..................... 221/150 A, 150 HC; 222/77, 370; 99/357, 407, 409, 427, 403

[56] References Cited

U.S. PATENT DOCUMENTS

| | | |
|---|---|---|
| 1,189,954 | 7/1916 | Jacobs . |
| 1,649,488 | 11/1927 | Robinson . |
| 1,890,737 | 12/1932 | Leweke . |
| 2,188,969 | 2/1940 | Waldvogel . |
| 2,640,414 | 6/1953 | Jensen . |
| 2,950,024 | 8/1960 | Adler . |
| 3,076,580 | 2/1963 | Heath . |
| 3,129,853 | 4/1964 | Hoskins . |
| 3,214,058 | 10/1965 | Sergio . |
| 3,313,430 | 4/1967 | Erickson . |
| 3,542,255 | 11/1970 | Oetiker . |
| 3,643,404 | 2/1972 | Ronning . |
| 3,762,394 | 10/1973 | Newcomer . |
| 3,818,820 | 6/1974 | Harris et al. . |
| 3,870,193 | 3/1975 | Schneider . |
| 3,943,841 | 3/1976 | Huang . |
| 4,155,294 | 5/1979 | Langhammer et al. . |
| 4,169,419 | 10/1979 | Burgess . |
| 4,203,358 | 5/1980 | Vogt . |
| 4,295,419 | 10/1981 | Langhammer . |
| 4,491,065 | 1/1985 | Poulson . |
| 4,503,760 | 3/1985 | Pryputsch et al. . |
| 4,517,651 | 5/1985 | Kawasaki et al. . |
| 4,598,378 | 7/1986 | Giacomo . |
| 4,722,267 | 2/1988 | Galockin . |
| 4,763,572 | 8/1988 | Kuehl . |
| 4,776,317 | 10/1988 | Pinnow . |
| 4,838,455 | 6/1989 | Hoeberigs . |
| 4,854,949 | 8/1989 | Giles, Sr. et al. . |
| 4,865,864 | 9/1989 | Rijswijck . |
| 5,097,754 | 3/1992 | Covington et al. . |
| 5,115,731 | 5/1992 | Maitland . |
| 5,134,927 | 8/1992 | McCarthy, III et al. . |
| 5,148,737 | 9/1992 | Poulson . |
| 5,174,470 | 12/1992 | North et al. . |
| 5,193,444 | 3/1993 | Bar-Sheshet . |
| 5,203,253 | 4/1993 | Covington et al. . |
| 5,325,766 | 7/1994 | Mareels ............................ 99/407 |
| 5,340,949 | 8/1994 | Fujimura et al. ................ 222/77 |
| 5,345,041 | 9/1994 | Swanson ......................... 222/77 |

*Primary Examiner*—Kenneth Noland
*Attorney, Agent, or Firm*—Burns Doane Swecker and Mathis

[57] ABSTRACT

The present invention relates to a heating system which includes a product dispensing assembly, a heating basket mounted for rotation within a closed-loop air heating system, a separator for removing entrained particulates from the circulating air stream, and an air exchange system for refreshing air in the closed-loop air heating system. The product dispensing assembly accurately meters a portion of the product, and includes a hopper with an helix auger, a weigh scale and a trap door for dispensing the metered product into the heating basket.

38 Claims, 9 Drawing Sheets

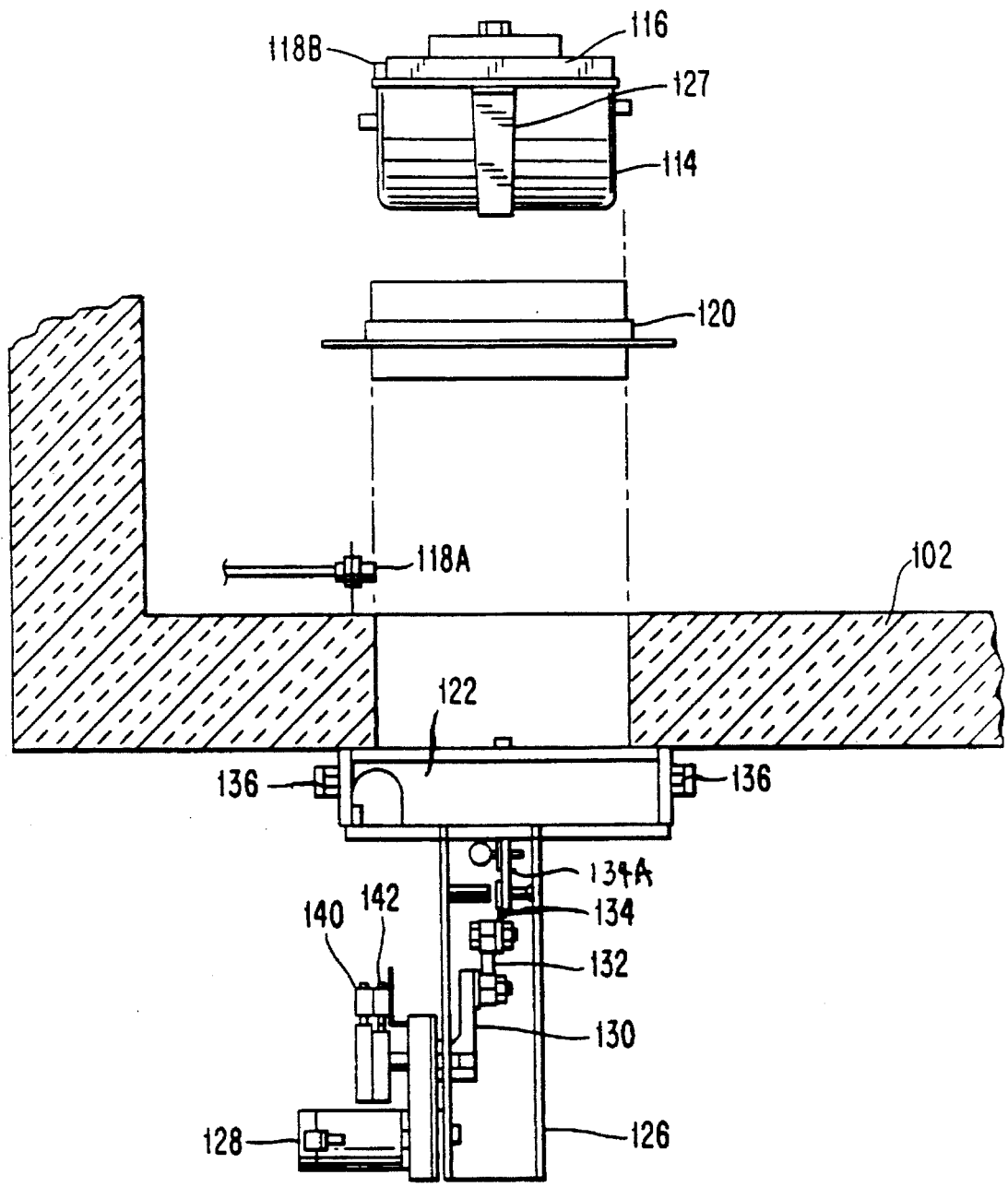

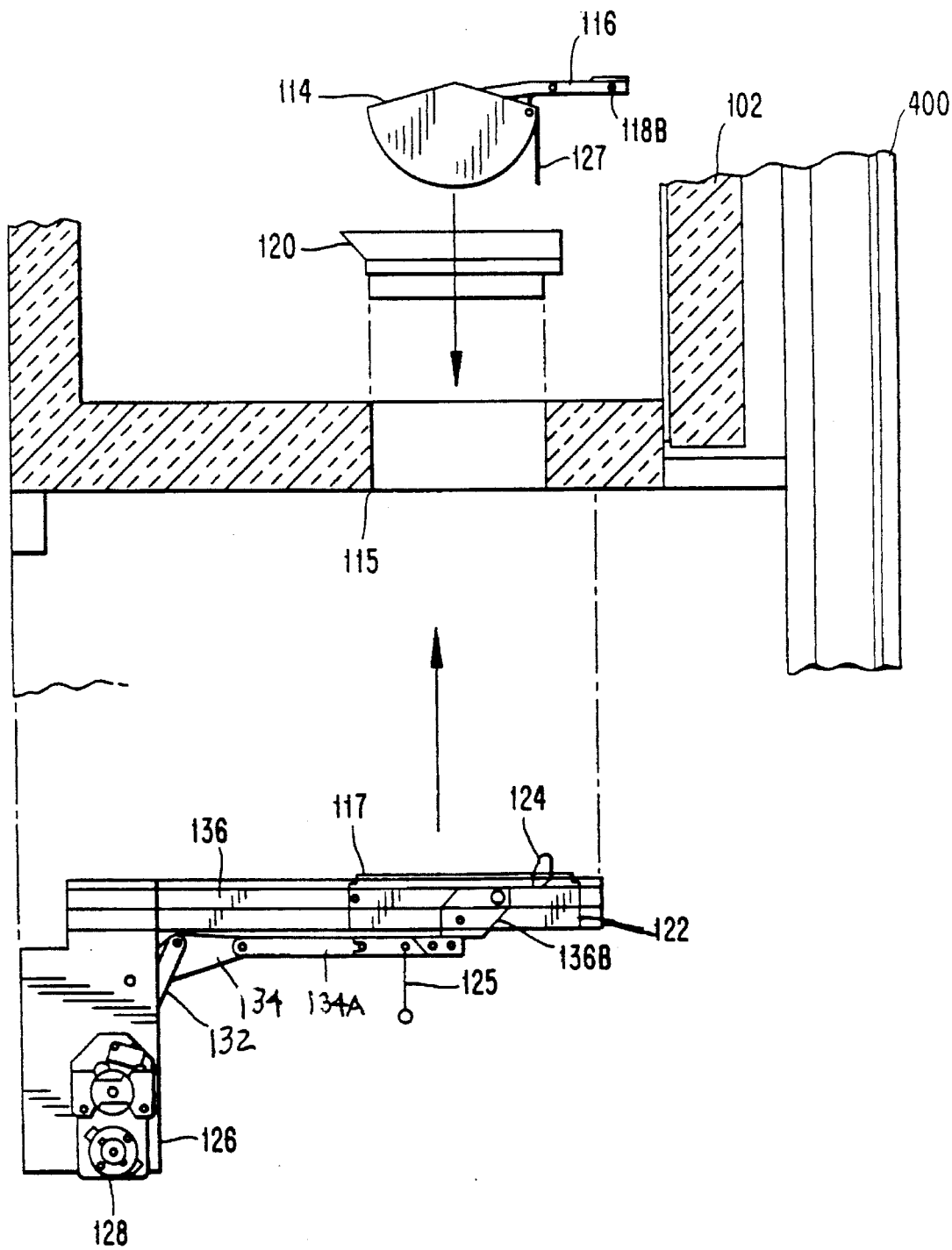

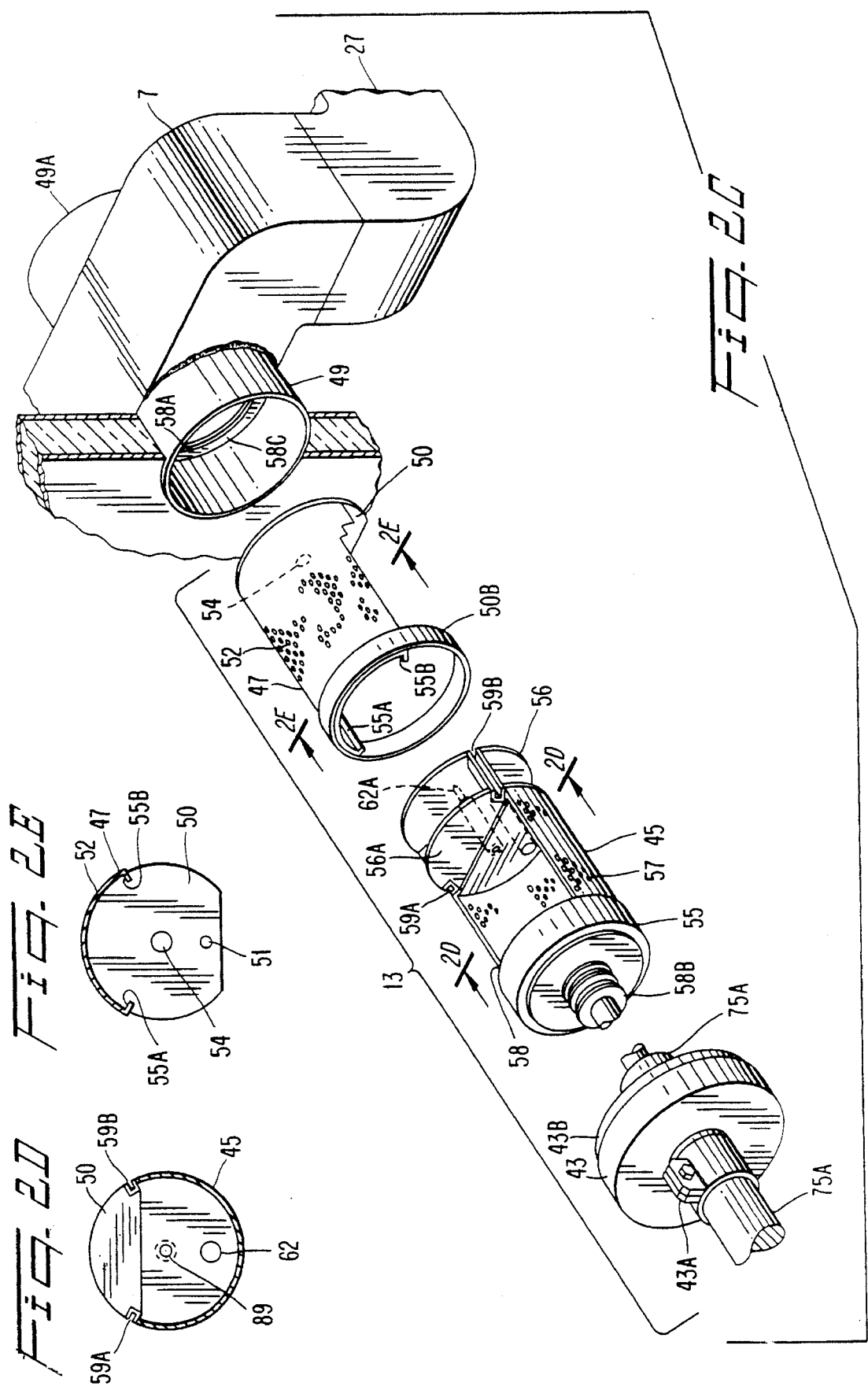

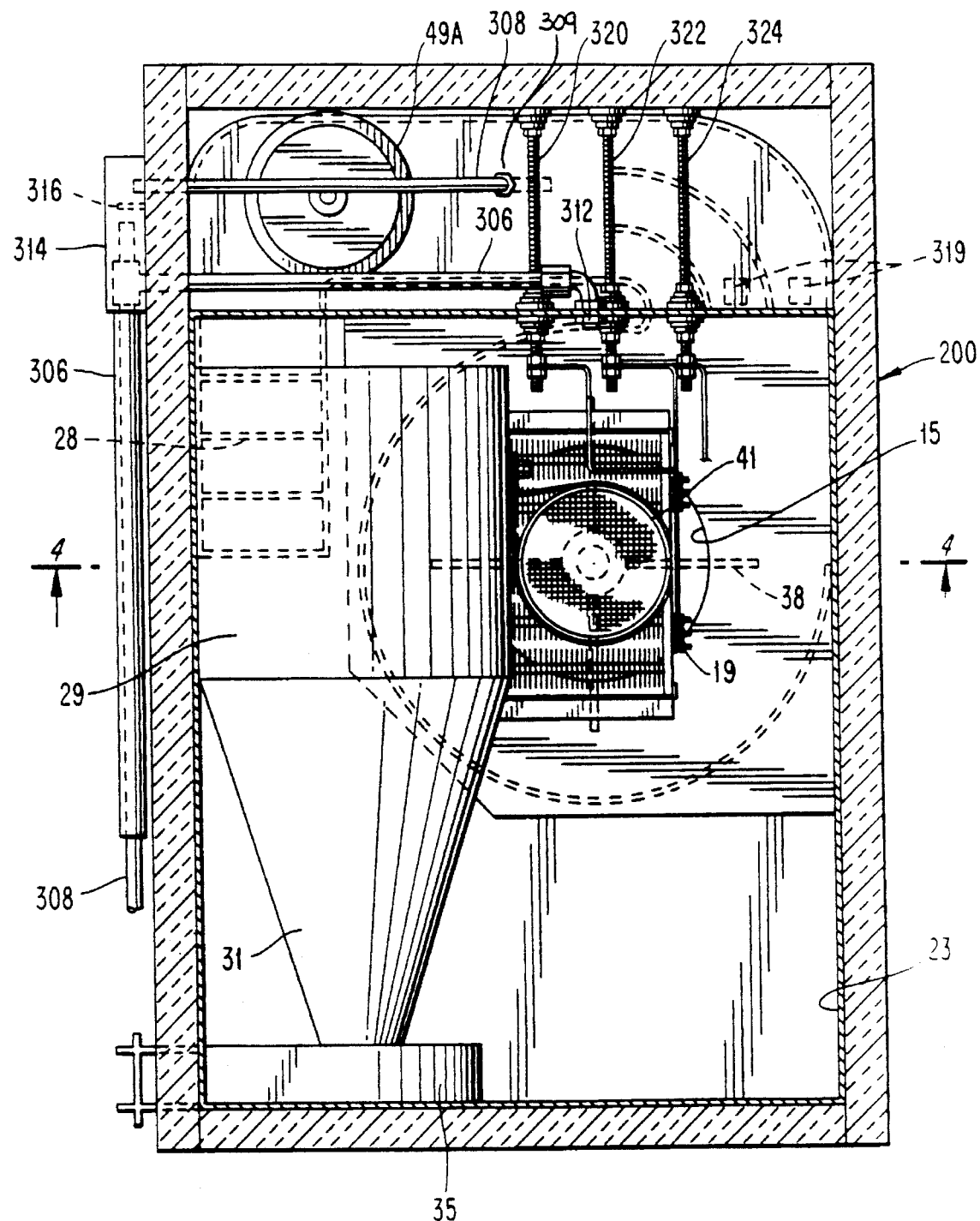

AUTOMATIC AIR HEATING SYSTEM FOR VENDING MACHINES

This application is a divisional, of application Ser. No. 08/020,715 filed Feb. 22, 1993 now U.S. Pat. No. 5,419,239, which is a Continuation-In-Part application of Ser. No. 07/855,927 filed Mar. 24, 1992 issued as U.S. Pat. No. 5,203,253 which is a Continuation-In-Part application of Ser. No. 07/594,382 filed Oct. 9, 1990, issued as U.S. Pat. No. 5,097,754.

BACKGROUND OF THE INVENTION

1. Related Applications

The present application is a continuation-in-part of commonly assigned, allowed U.S. patent application Ser. No. 07/855,927, filed Mar. 24, 1992, which is a continuation-in-part of commonly-assigned United States Pat. No. 5,097,754, both of which are entitled *Automatic Air Cooking System for Vending Machines*, the entire disclosures of which are hereby incorporated by reference herein.

2. Field of the Invention

The present invention generally relates to heating systems and, more particularly, to vending machines having systems that can be used for heating, reheating or cooking.

STATE OF THE ART

Various systems have been proposed for use in machines that vend heated foods. These systems typically include energy sources, such as electrical heat, infrared, or microwave energy. Such systems can provide thermal energy for heating among other products, french fries. In practice, proposed vending systems have significant shortcomings, including the production of strong, burnt odors during normal operation. Further, many of these systems require prolonged cooking periods. Also, many of these systems produce food products that are not heated uniformly.

SUMMARY OF THE INVENTION

Generally speaking, the present invention relates to an apparatus having a closed-loop air heating system. The closed-loop air heating system can be used, for example, in vending machines that vend heated or cooked merchandise such as french fried potatoes and the like.

In an exemplary embodiment, the apparatus includes a product dispensing means for supplying a metered amount of a product, such as frozen french fried potatoes; a closed-loop air heating system; and an air exchange means for replacing air in the closed-loop air heating system. In accordance with the present invention, metering of the product during each vend is very accurately controlled. The product dispensing means transports and precisely meters a predetermined amount of frozen product from a freezer for heating in the closed-loop air heating system. To optimize energy expenditure during a metering operation, access to the frozen product is controlled by a unique freezer access door.

In an exemplary embodiment, the closed-loop air heating system of the present invention includes the following major components: a closed-loop air duct assembly; a cooking basket means for receiving a metered amount of the product and mounted for rotation within the air duct assembly; fan means for forcing air through the air duct assembly; heating means for heating air that circulates within the air duct assembly; and separator means for removing entrained particulates from the air stream that circulates within the air duct assembly.

The basket means of the closed-loop air heating system includes a basket assembly which is quickly withdrawn from the closed-loop air heating system and filled with a serving portion of the frozen product. The basket assembly is then quickly returned to the heated air stream and rotated therein for a predetermined period of time to uniformly expose the serving portion to the heated air stream. The basket assembly is only removed from the sealed closed-loop air heating system to receive the frozen product from the product dispensing means or to transfer the heated product to the customer.

The separator means of the closed-loop air heating system removes oil and other particulates from the closed-loop air stream. The separator means prevents particulates from reaching the heating system, thereby minimizing cooking odors. The separator means is also a thermal mass that absorbs heat from, and provides heat to, the circulating air stream. This permits a relatively constant temperature to be maintained in the closed-loop air heating system without expending a significant amount of energy.

The air exchange means vents cooking odors which are created in the closed-loop air heating system so that they do not build-up and influence the flavor of the heated product. The air exchange means vents air from the closed-loop air heating system and replaces the vented air with fresh air from outside the closed-loop air heating system. Further, the air exchange means includes concentric input and output tubes which interactively operate as a heat exchanger to avoid any significant energy expenditure in freshening air within the closed-loop air heating system.

BRIEF DESCRIPTION OF THE DRAWINGS

The present invention can be further understood with reference to the following description in conjunction with the appended drawings, wherein like elements are provided with the same reference numerals. In the drawings:

FIGS. 1B and 1C are partial front and side view illustrations of a portion of the FIG. 1 product dispensing assembly;

FIG. 2C is an exploded pictorial view of the rotary cooking basket assembly;

FIGS. 2D and 2E show cross-sectional details of the rotary cooking basket assembly;

FIG. 3 is a partial right side view of the FIG. 2A closed-loop air heating system 200 with an insulator cover removed.

DETAILED DESCRIPTION OF THE PREFERRED EMBODIMENTS

Figure 1A:
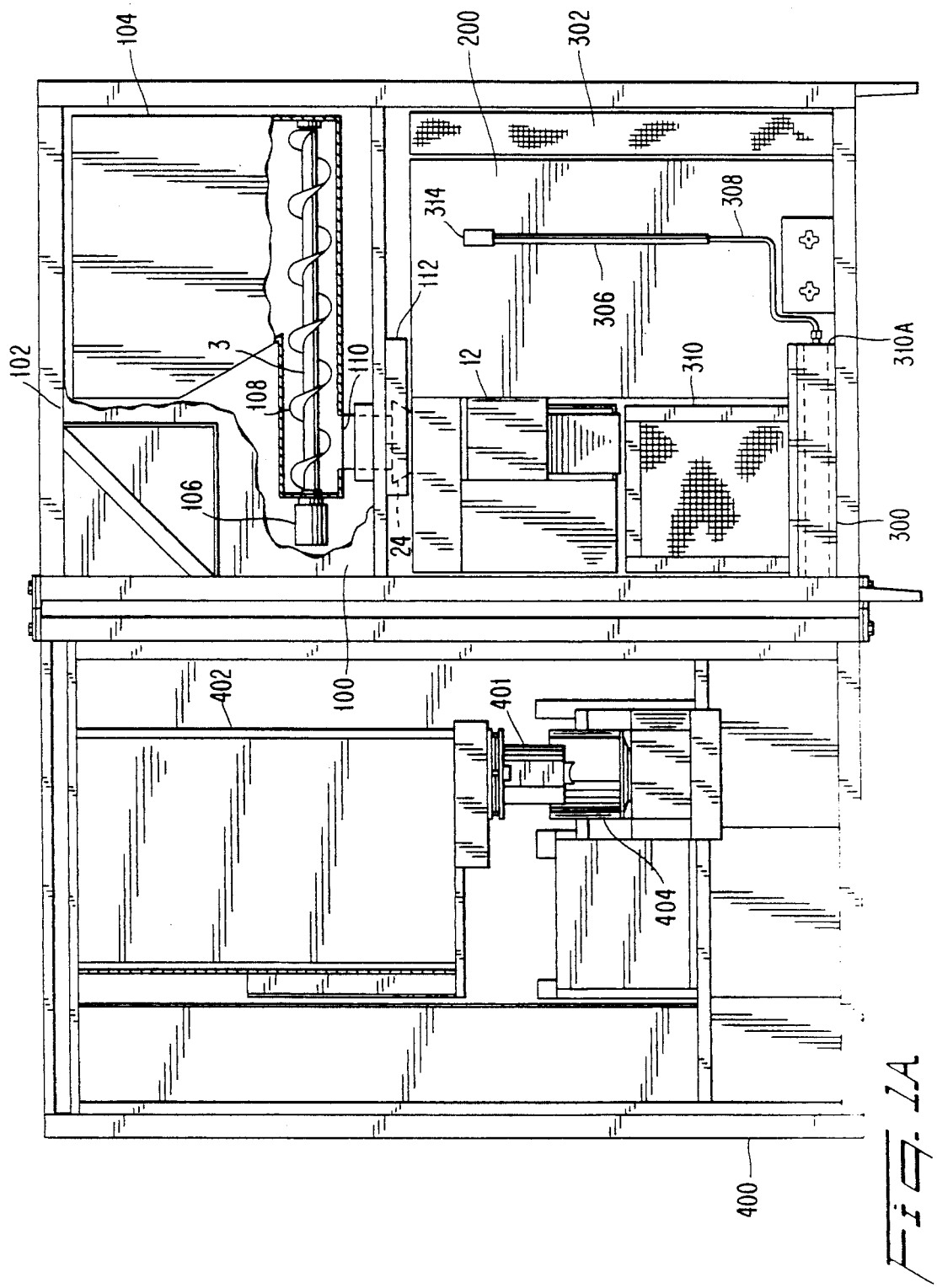
FIG. 1A is a front view of a machine having its front door unit opened to expose an interior of the machine according to the present invention.

FIG. 1A shows the major components of an apparatus (e.g., vending machines) that can be used to vend food products such as french fried potatoes and the like. For purposes of the following discussion, specific reference will be made to the heating or cooking of french fried potatoes. However, it will be apparent that the disclosed system can be used to heat any product introduced into the closed-loop air heating system.

For purposes of illustration, an interior of the FIG. 1A vending machine constructed in accordance with the present invention has been exposed by opening a front door 400 to the left hand side. Referring to FIG. 1A, a front view of an exemplary apparatus having a product dispensing means 100, a closed-loop air heating system 200, and an air exchange means 300 is shown.

Although the exemplary product dispensing means 100 is illustrated with respect to the FIG. 1A vending machine, those skilled in the art will appreciate that it can be used to dispense any product, frozen or otherwise, where precise metering is desired. Because a frozen product is dispensed in FIG. 1A, the exemplary product dispensing means is an assembly which includes a freezer 102 with a hopper 104 for maintaining a supply of the frozen product (e.g., supply of frozen french fries) at a controlled temperature (e.g., 0° F.). In practice, the french fried potatoes are at least partially pre-cooked and then frozen. The pre-cooking minimizes the time required by the closed-loop air heating system to complete the heating process, and allows the food products to be pre-cooked by a medium other than hot air. For example, in the case of french fried potatoes, pre-cooking can be done in hot oil.

The product dispensing means further includes a helix auger motor 106 for rotatably driving a helix auger 108. The helix auger is oriented horizontally in FIG. 1A and extends from an opening 110 in a bottom portion of the hopper 104, along an entire length of the hopper, to a point near a bottom portion of an angled chute on the right hand side of the hopper. As illustrated in FIG. 1A, a left hand portion of the hopper is sloped inward to prevent inadvertent dispensing of the frozen product through the opening 110. Further, the sloped side wall of the hopper 104 limits the weight of product that rests on the helix auger 108. The sloped side wall of the hopper 104 mitigates or prevents breaking of the frozen product (e.g., frozen fries) by limiting the exposure of the helix auger to the full length of the hopper. Thus, frozen fries which are drawn into the far right hand side of the hopper can be moved by the helix auger 108 to the opening 110 with little or no breakage of the fries.

In operation, as the helix auger is rotated, frozen french fries slide down the angled chute of the hopper into the helix auger. As the helix auger continues to rotate, it draws the frozen french fries horizontally across the hopper from the far right hand side of the FIG. 1A hopper to a point located above the opening 110 in the bottom of the hopper 104. At the opening 110, the frozen fries drop into a weighing means 112, such as a weigh scale, of the product dispensing means.

The helix auger is configured with a number of coiled turns, or flights, which extend across its length. To optimize weight control, the volume of product in the helix is controlled by a tubular insert 3 (approximately 2 inches in diameter) which runs through the center of the helix auger and is coaxial with the helix auger. The tubular insert reduces the number of fries in each helix auger flight.

In addition, the number of flights per inch is decreased from right to left. That is, the distance between flights of the helix auger which are enclosed in the hopper 104 is approximately 3.0 inches, with this distance increased to a maximum of approximately 5 inches over the opening 110 (the opening 110 being approximately 5 inches long and 3.5 inches wide in an exemplary embodiment). The helix auger is rotated at approximately 5.2 rpm.

The helix auger configuration and operation limits the amount of product in each flight, and spreads the product out such that accurate filling of the weighing means 112 can be accomplished. Uncontrolled sloughing of product into the weighing means after the helix has stopped due to machine vibration is thereby avoided. The helix auger can be slowed to extend the filling time to about 35 seconds, thus further enhancing filling accuracy. Because the re-filling of the weighing means occurs during the heating cycle, this more precise helix auger control does not increase overall vend cycle time.

The exemplary weighing means 112 of the product dispensing means illustrated in FIG. 1A includes a weigh scale and trap door assembly for ensuring that only a predetermined amount (e.g., weight) of product is heated during any one vend cycle (i.e., single serving). The weigh scale and trap door assembly receives the product dropped by the helix auger 108 and controls dispensing of the product to the closed-loop air heating system via a chute 24. The weigh scale controls operation of the helix auger motor 106 so that the motor continues to run from the time the weigh scale is emptied in response to a request for a serving of french fries (e.g., as determined by depositing a correct amount of currency/coinage into a currency/coinage receptacle of the vending machine), until a predetermined weight (e.g., 3.5 ounces of french fries) has been delivered to the weigh scale. A time-out is included to avoid excessive operation of the helix auger motor 106 when the hopper 104 is empty.

The weigh scale and trap door assembly will be described more fully with respect to FIGS. 1B and 1C. FIG. 1B shows a front view of an exemplary weigh scale and trap door assembly. As shown in FIG. 1B, a weigh scale bucket 114 is provided for mounting in a lower left hand corner of the freezer 102. The weigh scale bucket fits within a weigh scale chute 120.

The weigh scale bucket 114 stores, for example, 3.5 ounces of french fries in preparation for a subsequent vend. The weigh scale bucket 114 is attached to a weigh scale pivot arm 116 and operates on a balance scale operation. The weigh scale bucket is designed to pivot freely about the weigh scale pivot arm 116. The center of gravity of the fries being loaded is thereby maintained at a uniform moment at arms length relative to a balance point of the weigh scale pivot arm 116 regardless of where the fries fall in the bucket, hence improving weight control.

When a sufficient number of fries are dropped by the helix auger into the weigh scale bucket 114, the unbalanced weigh scale pivot arm 116 tips slightly until the weigh scale bucket nests in a stop of the weigh scale chute 120. When the weigh scale pivot arm 116 tips, it moves a proximity sensor 118B which activates a proximity detector 118A to send a signal to a controller for deactivating the helix auger motor 106. The filled weight scale bucket 114 retains a serving of product in the freezer above a trap door 122. When a subsequent vend is initiated, the trap door 122 is automatically opened and contents of the weigh scale bucket are dispensed to the closed-loop air heating system.

As shown in FIG. 1B, the trap door 122 is driven by a trap door drive assembly 126 which includes two cam operated microswitches 140, 142 that send signals to the aforementioned controller for controlling a trap door drive motor 128. The microswitches and cams are operatively positioned to signal complete opening and closure, respectively of the trap door 122 for controlling the rotational direction of the trap door drive motor 128 when a vend cycle is initiated.

The trap door 122 and trap door drive assembly 126 represent a unitized frame and hardware assembly for providing one piece assembly for insertion into a vending machine. The unitized frame accurately locates all components such that no linkage adjustment is necessary once the unitized frame has been installed into the vending machine. The trap door 122 and trap door drive assembly 126 will be described more fully with respect to FIG. 1C.

Referring to FIG. 1C, the contents of the weigh scale bucket 114 are emptied by pivoting the weigh scale bucket via a bail 127. The bail 127 attaches the weigh scale bucket to the trap door drive assembly 126 via a bail hook 124. When a subsequent vend cycle is initiated, the trap door 122 slides to the left of FIG. 1C, with the weigh scale bucket being tipped via movement of the trap door 122 and bail hook 124. The french fries stored in the weigh scale bucket 114 are thereby delivered via the weigh scale chute 120 through a freezer opening 115.

The trap door 122 is designed to optimize thermal characteristics of a barrier between the freezer and the heating area. The high temperature side of the freezer door 122 has a layer of silicone insulation to prevent heat migration through the metal from damaging the inner low temperature insulation on the freezer side of the trap door. Thus, inexpensive, thermally efficient insulation can be used on the freezer side of the trap door 122.

A silicon formed "e" section seal 117 for the freezer fitted against the support frame and provides an improved seal against the freezer opening 115 when attached in place. A compressible section below the silicon formed "e" section seal allows the insulated trap door 122 to seal the freezer opening above from the heating area below.

In operation, the trap door drive assembly 126 is connected via a unique offset cam hinge assembly 136B and ring pin 125 to the trap door 122. The unitized frame and hardware assembly of the trap door assembly 126 includes a support frame formed to provide integral guide paths for roller bearings included on the offset cam hinge assembly 136B.

The trap door drive assembly 126 includes two guide arms and a spacer held together by two small bolts, with each guide arm being bent into a left and right hand Z shape. Each guide arm has a roller bearing cam follower and a guide pin pressed into place. The roller bearings are contained within the guide paths of the support frame when assembled and provide the travel support to cause camming of the trap door vertically against the freezer seal, and carry the trap door in its horizontal travel during operation of the trap door drive motor 128. The roller bearings also preclude potential galling or abrasion along the guide frame path. The cam assembly also provides for quick release, which can be implemented by pulling a pin 125 such that the cam and trap door 122 can be readily removed from the trap door drive assembly for easy cleaning or inspection.

The trap door drive assembly 126 contains linkage for providing appropriate motion to allow the cam to free the trap door from the freezer seal by vertical movement via operation of the trap door drive motor 128 and an associated gear box. The operation of the trap door drive motor and gear box controls an adjustable linkage 132 to a rocker arm to move the trap door. The adjustable linkage 132 further controls the length of the horizontal travel of the trap door.

As the trap door drive assembly 126 is operated, the trap door drive motor 128 rotates to pivot levers 130, 132, 134 and 134A. The trap door 122 is initially cammed vertically downward by the roller bearings of the offset cam 136B to clear the freezer seals. Continued rotation of the motor 128 then causes the levers 130, 132, 134 and 134A to slide the trap door 122 to the left of FIG. 1C with continued movement of the roller bearings along grooves 136 of the trap door assembly.

As the bail hook 124 draws the bail 127 to the left of FIG. 1C, the weigh scale bucket is tipped to deliver its contents through the weigh scale chute 120. The trap door 122 pauses in the full open position to allow product to clear the weigh scale bucket, then returns to the home position by first moving right to a position directly under the freezer opening. The trap door 122 is then moved nearly vertically upward to compress the seals into the freezer opening 115 via the cam assembly 136B.

Having discussed the product dispensing means, the closed-loop air heating system 200 and the air exchange means 300 of FIG. 1A will now be described in greater detail. The exemplary closed-loop air heating system 200 of FIG. 1A receives metered portions of frozen food product from chute 24 of the product dispensing means. The air exchange means maintains air freshness in the closed-loop air heating system with minimal energy loss.

The air exchange means includes two key portions: a first exterior ventilation portion which vents an area surrounding an exterior of the closed-loop air heating system 200, and a second interior ventilation portion which vents an interior area of the closed-loop air heating system 200.

The primary functions of the exterior ventilation portion are: 1) to provide cooling air for the cabinet interior of the FIG. 1A apparatus when the door 400 is closed; 2) to provide a fresh air supply for use by the interior ventilation portion; and 3) to provide cleaning and deodorization of smokey air that might be released by the interior ventilation portion.

The primary function of the interior ventilation portion of the air exchange means is to provide a thermally efficient, mechanically simple way to keep the air fresh inside the closed-loop air heating system. The closed-loop air heating system extracts both water and oil vapor from each vend of the product. If not continuously freshened with clean air, the vapor becomes saturated and imparts flavors (e.g. burnt flavor) into the heated french fry (or other product.)

As shown in FIG. 1A, the exterior ventilation portion of the air exchange means 300 vents air from a sealed interior of the FIG. 1A apparatus to an exterior of the FIG. 1A apparatus. Although the hinged door unit 400 is pivoted to the left hand side of FIG. 1A to expose the interior of the FIG. 1A apparatus, the area surrounding the closed-loop air heating system 200 is relatively sealed when this door unit is closed. The exterior ventilation portion is designed to distribute incoming air over the top and around all sides of the closed-loop air heating system 200. This provides an air envelope between an exterior of the closed-loop air heating system and the inside of the FIG. 1A apparatus.

To provide fresh cooling air to an interior of the FIG. 1A apparatus, the air exchange means 300 includes a vent 302 formed as a screen in a rear panel of the FIG. 1A apparatus. The vent 302 is approximately 4 inches wide and extends the height of the closed-loop air heating system (e.g., 30 inches).

An exhaust fan of the exterior ventilation portion is located on a side of a fan and filter unit 310 opposite the side illustrated in FIG. 1A. The fan and filter unit 310 represents a main air exchange system which includes a metal condensing filter, an electrostatic precipitator and a carbon filter mounted on the suction side of the exhaust fan. The fan and filter unit 310 provide vapor condensation, dust or carbon particle precipitation and carbon filter deodorization.

The exhaust fan of the fan and filter unit 310 (capable of moving up to 350 cubic feet of air per minute in an exemplary embodiment) is operated to draw air into the FIG. 1A apparatus through vent 302, over and around the exterior of the closed-loop air heating system 200 and out through a vent (not shown) on a bottom of the FIG. 1A apparatus. Thus, any heat or vapors which may exist within the FIG. 1A apparatus due to operation of the closed-loop air heating system are removed. Further, the passage of fresh air around the exterior of the insulated closed-loop air heating system 200 helps moderate the temperature of this area without significantly affecting the interior temperature of the insulated closed-loop air heating system. The heating system insulation and the air flow volume are designed to accommodate a 1°–7° F. temperature rise in the air stream under normal operating conditions.

The interior ventilation portion of the air exchange system includes a unique thermal heat exchanger. The heat exchanger operates solely on pressure differentials within the closed-loop air heating system 200 to provide clean air which freshens the mass of recirculated air within the closed-loop air heating system. A small copper exhaust tube 308 is inserted into a high pressure side air duct of the closed-loop air heating system 200 and bleeds approximately 1 (one) cubic foot per minute of 455° F. air out of the closed-loop air heating system into a clean-out box 314.

The clean-out box 314 acts as a condenser for oil and water vapor which is carried in the otherwise clean air stream of the closed-loop air heating system. The air which is bled from the interior of the closed-loop air heating system to the clean-out box 314 is next forced vertically down through a portion of an exhaust tube 308 shown in FIG. 1A. This portion of exhaust tube 308 is shown to be located within a relatively large diameter air intake tube 306, which cools the air in the exhaust tube 308.

The exhaust tube 308 delivers the cooled exhaust air to an expanded cavity of a pre-filter unit 310A where further condensation occurs. The exhaust air is pulled through a polyester fiber filter and a carbon filter of the pre-filter 310A by the exhaust fan of the exterior ventilation portion. The pre-filter unit 310A is located in front of the fan and filter unit 310. The exhaust from the pre-filter unit 310A is pulled directly into the fan and filter unit 310 and is blended with the cooling air drawn in from vent 302 as the cooling air passes through the fan and filter unit to the environment.

The exposed end of the intake tube 306 which is shown in FIG. 1A draws fresh air from the exterior of the closed-loop air heating system 200 into a suction side within the closed-loop air heating system. Hence the intake tube 306 draws in fresh air to equilibrate the interior of the otherwise closed-loop air heating system 200.

The location of the air intake tube 306 over the exhaust tube 308 operates as a heat exchanger. This heat exchanger cools the hot air which is bled from the high pressure side of a fan in the closed-loop air heating system to about 115° F. at the output of exhaust tube 308. The heat exchanger also heats fresh air entering the intake tube 306, hence conserving energy required to heat fresh air entering the closed-loop air heating system. The locations of the intake tube 306 and exhaust tube 308 relative to the interior of the closed-loop air heating system will now be described in conjunction with a more detailed description of the closed-loop air heating system 200 and basket assembly 12.

Figure 2A:
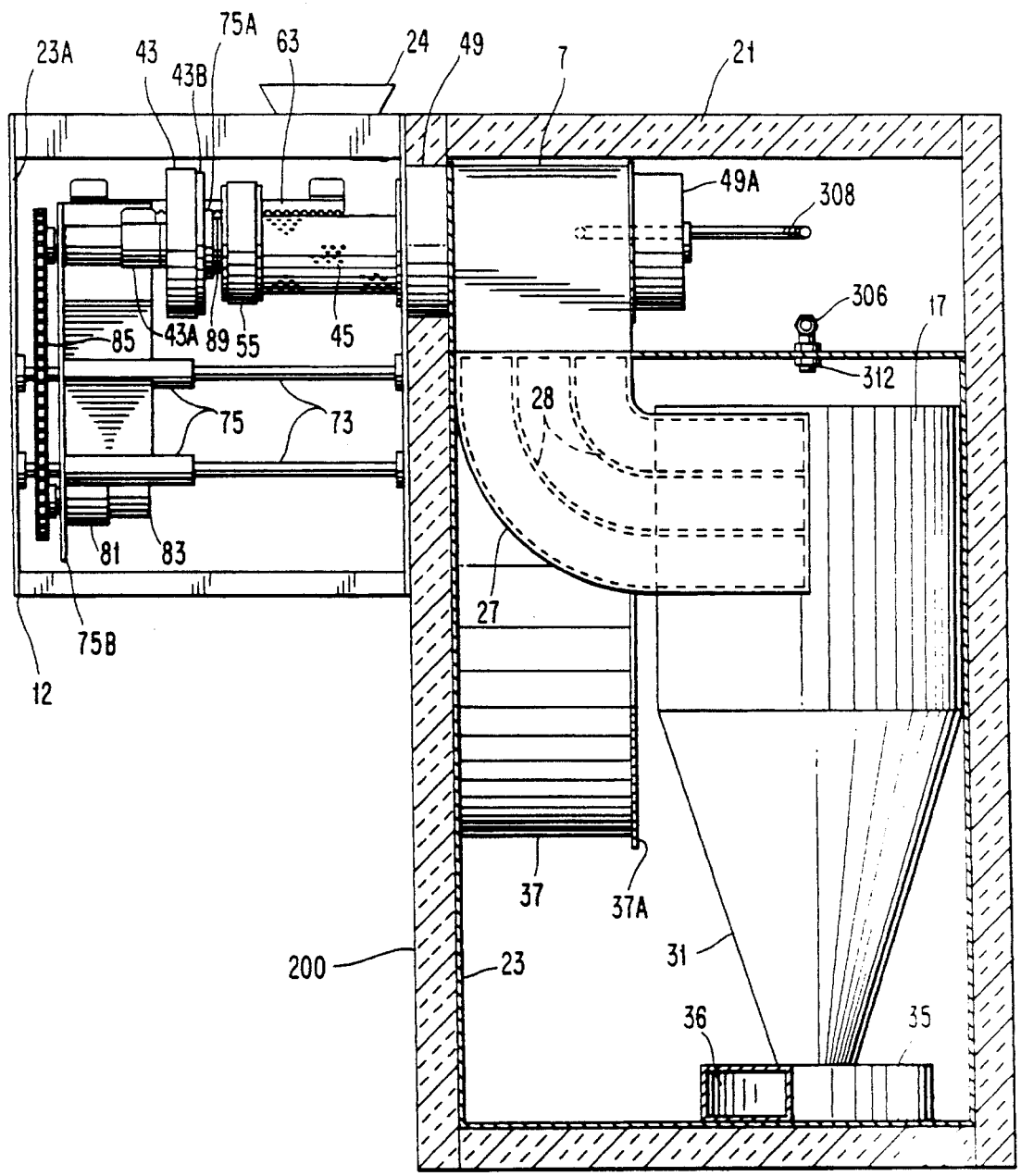
FIG. 2A is a partial front perspective of the interior of the closed-loop air heating system 200 and its attendant basket assembly and drive 12, with their front covers removed for purposes of illustration.

FIG. 2A shows an interior portion of the FIG. 1A closed-loop air heating system 200 with its attendant basket assembly and drive 12 (i.e., with front covers removed). As can be seen, the tubes 306 and 308 enter the interior of the heating system to input fresh air to one location and to remove circulated air from another location within the FIG. 2A closed-loop air heating system. The intake tube 306 is directed from a position beyond the removed front cover into the page (as better illustrated in FIG. 3) and then downward into a low pressure area of the FIG. 2A heating system via joint 312. The exhaust tube 308 is directed from a position beyond the removed front cover, into the page along a path located above the intake tube (as better illustrated in FIG. 3) to the left of FIG. 2A to remove air from a high pressure area of the closed-loop air heating system within a closed-loop air duct section 7.

A lower basket portion 45 of a basket assembly 13 is mounted for selective insertion into, and withdrawal from, the closed-loop air duct section 7 and associated cylindrical sleeves 49 (cooker seal tube) and 49A (cooker plug cap) which are attached to each side of the closed-loop air duct section 7. These cylindrical sleeves 49 and 49A provide sealed areas of travel for the basket assembly and accommodate insulation material 21 of a housing 23 which is outside the closed-loop air duct section 7.

The cooker seal tube 49 is mounted to the air duct section 7 for receiving the lower basket portion 45 while protecting the insulation 21 and providing space to accommodate an insulated seal plug 55 of the basket assembly 13. The insulated seal plug 55 seals the closed-loop air heating system when the basket is in its "in" position. The cooker seal tube 49 is located such that the axial centerline of the basket assembly 13 extends into the cooker plug cap, transverse to the general direction of air flow through the air duct section 7.

The cross-sectional dimension of the air duct section 7 normally is selected such that substantially all of the air flowing through the air duct section 7 is forced through the basket assembly 13. This is done for purposes of efficiency and for enhancing the uniformity with which food is cooked by the closed-loop air heating system.

As shown in FIG. 2A, the lower basket portion 45 is in a retracted, "out" state wherein it has been withdrawn from the air duct section 7. In an exemplary embodiment, the lower basket portion 45 is only withdrawn from duct section 7 when the lower basket portion is being filled or when the lower basket portion is being emptied. When the lower basket portion 45 is inserted in the air duct section 7, a gasket (e.g., silicon ring) 43B of the basket assembly 13 forms a stationary seal between an outer seal flange assembly 43 and the cooker seal tube 49. The gasket 43B can be formed by attaching a strip of silicon material, which is wider than the flange assembly 43, about an inner periphery of the flange assembly so that a portion of the silicon strip extends beyond the flange assembly as illustrated in FIG. 2A. By keeping the lower basket portion in the duct section 7, the insulated seal plug 55 and the outer seal flange assembly 43 ensure that only minimal heat loss occurs from the closed-loop air heating system through the opening in the air duct section 7.

The outer seal flange assembly 43 is axially mounted on a traveling basket mount sleeve 75A by means of a split collar clamp 43A. The clamp allows the outer seal flange assembly 43 to be moved axially along sleeve 75A to adjust seal pressure between outer seal 43B and the cooker seal tube 49. The outer seal flange assembly 43 provides additional thermal insulation and further prevents the loss of heated air while foods are being heated in the closed-loop air heating system.

In operation, the outer seal flange assembly 43 is manually adjusted by loosening clamp 43A to a set point. The outer seal flange assembly 43 can then be moved axially back and forth toward and away from the sleeve 49 by a reciprocating mechanism 61. The reciprocating mechanism also moves the lower basket portion 45 into and out of the air duct section 7.

Figure 2B:
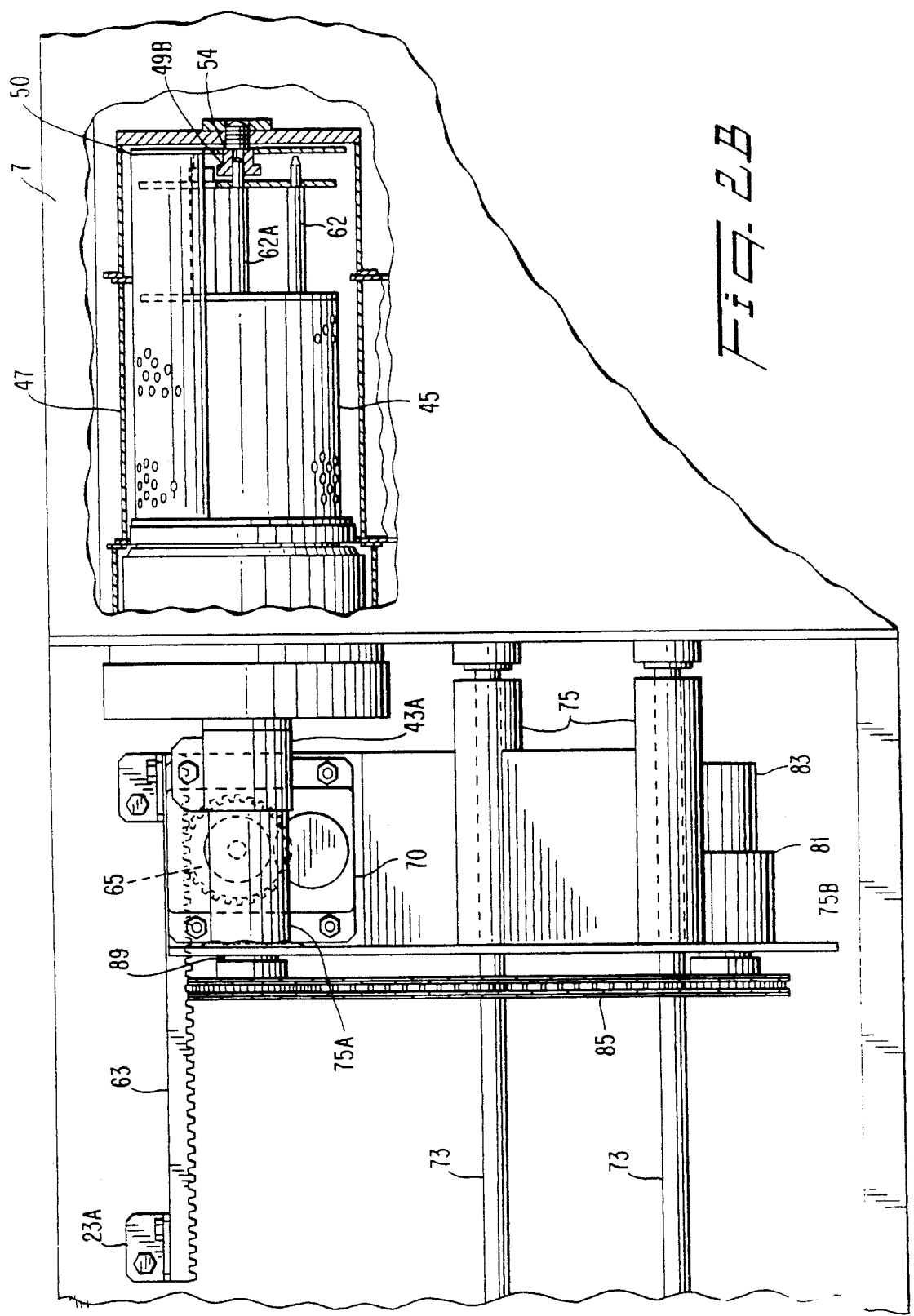
FIG. 2B shows the basket assembly of FIG. 2A in its closed position within the closed-loop air duct assembly.

As illustrated in FIG. 2B, the reciprocating mechanism 61 includes two primary components: a) a linear gear (i.e., rack) member 63 which is fixed with respect to a mounting frame 23A and which extends in the direction of travel of the lower basket portion 45, and b) a rotatable pinion gear 65 which engages the linear gear and which is attached to and driven by a drive means illustrated as a gear motor 70, for selectively rotating the pinion gear 65.

A pair of guide rods 73 are mounted to a structural member of the mounting frame 23A, and extend in a direction parallel to the direction of travel of the lower basket portion 45. A pair of sleeve members 75 are mounted to slide on respective ones of the guide rods 73. The lower basket portion 45 is connected to the sleeve member 75 via a rigid plate 75B and the sleeve 75A.

In operation of the reciprocating mechanism 61, the lower basket portion 45 is selectively moved into or out of the air duct assembly 7 by rotation of the gear motor 70. Rotation of the gear motor 70 rotates the pinion gear 65. As the pinion gear rotates, it travels along the linear gear member 63 and thereby moves the heating basket assembly 13 back and forth. The motion of the lower basket portion 45 is guided by the sleeve members 75 sliding on the guide rods 73. As the reciprocating mechanism moves the lower basket portion 45 into the cylindrical duct sleeve 49, the lower basket portion 45 mates with a basket cover 47 until the lower basket portion is completely covered.

A rotary drive mechanism 81 is provided for selectively rotating the mated lower basket portion 45 and basket cover 47 of the basket assembly 13. In the illustrated embodiment, the rotary drive mechanism includes an electric gearmotor 83. The gearmotor 83 is connected, via a drive chain 85 and a shaft 89 (which passes through sleeve 75A) to the basket assembly 13. The shaft 89 extends in the direction of the axial centerline of the basket assembly and is connected for rotating the basket assembly. Full rotation of the complete basket assembly 13, including both the lower basket portion 45 and basket cover 47 (which remains in the air duct section 7), occurs during heating.

The shaft 89 is also used to perform rotation of the lower basket portion 45 and the basket cover 47 when the lower basket portion is positioned outside the air duct section 7. This rotation is used to discharge serving portions from the lower basket portion 45 (i.e., during times when the lower basket portion is withdrawn from the air duct section 7).

Both the lower basket portion 45 and the basket cover 47 are thus rotatable about their axial centerline. In particular, the basket cover 47 is mounted for rotation about a shoulder bolt 49B, which extends through a central aperture 54 in a circular end plate 50. A lower basket portion centering pin 62A inserts into a pivot hole in the center of the head of the shoulder bolt 49B.

As shown in FIGS. 2C–2E, when the lower basket assembly 45 is inserted into the air duct section 7, it mates with the basket cover 47 to provide a closed container that has a cylindrical shape. The basket cover 47 includes the circular end plate 50, an annular end ring 50B, and an approximately semi-cylindrical portion 52 which is constructed from a punched plate material. It may be noted that the circular end plate 50 has, in addition to the central aperture 54 (FIG. 2E), an off-center aperture 51. It should also be noted that the semi-cylindrical portion 52 includes guide flange members 55A and 55B that extend inwardly along its longitudinally-extending edges.

The lower basket portion 45, as shown in FIG. 2C, includes a pair of circular end plates 56 and 56A, the inner insulated seal plug 55, and an approximately semi-cylindrical basket portion 57 connected between the insulated seal plug 55 and the end plate 56A. The circular end plates 56 and 56A are separated by 4 metal dowels, two of which have longitudinally-extending grooves 59A and 59B formed therein (see also FIG. 2D). The grooves 59A and 59B are located for receiving the inwardly-extending guide flange members 55A and 55B, respectively of the basket cover 47.

The circular end plates 56 and 56A are further held together by the centering pin 62A, and a dowel pin, formed as offset drive pin 62, both of which extend through end plate 56. The offset drive pin 62 engages an off-center aperture 51 in the end plate 50 (FIG. 2E) when the basket cover 47 and lower basket portion 45 of the basket assembly are assembled. The centering pin 62A holds the lower basket assembly 45 concentric with the cooker plug cap 49A.

The lower basket portion 45 of FIG. 2C remains in contact with the basket cover 47 via grooves 59A, 59B and guide flanges 55A, 55B to assure basket registration. During mating, the lower basket portion 45 is inserted with a slightly upward angular orientation into the cylindrical sleeve 49 to preclude product spillage (i.e., upright). Thereafter, the basket assembly can be fully rotated during heating without discharging food.

The FIG. 2C basket assembly 13 is largely constructed from a patterned punched plate (62% open) material 57 that allows air to flow relatively freely through the basket. In practice, design of the basket is such that the pressure drop of air flowing through the basket ordinarily does not exceed about 1.25 inches of $H_2O$. The basket in the full "out" position leaves the end plates 56 and 56A positioned within the cooker seal tube 49 to act as air plugs during filling and unloading operations. End plate 56 stops approximately flush with the face of air duct section 7 while end plate 56A provides a partial seal at the outer end of seal tube 49. The space between the 2 plates minimizes duct blockage during basket withdrawal.

An annular inner seal member 58 is mounted on the insulated seal plug 55, and in operation moves lightly into contact with an annular inner seal member 58A of the cooker seal tube 49 and adjacent lock washer 58C of the cooker seal tube 49. Contact is maintained by tensioning springs included in a spring assembly 58B. In practice, the annular inner seal member 58 is a machined stainless steel plate and is held against the annular inner seal member 5SA (a flexible shim stock) by compression springs, disk washers and flat washers included in the spring assembly 58B. The annular inner seal member 58 has approximately the same diameter as the inner seal member 58A for sealing against the inner seal member 58A. This provides a metal to metal seal that reduces the loss of heated air while foods are being heated in the closed-loop air heating system. That is, the annular seal member limits outgassing of smoke or water vapor from products during heating as well as all other times except loading and unloading.

Figure 2F:
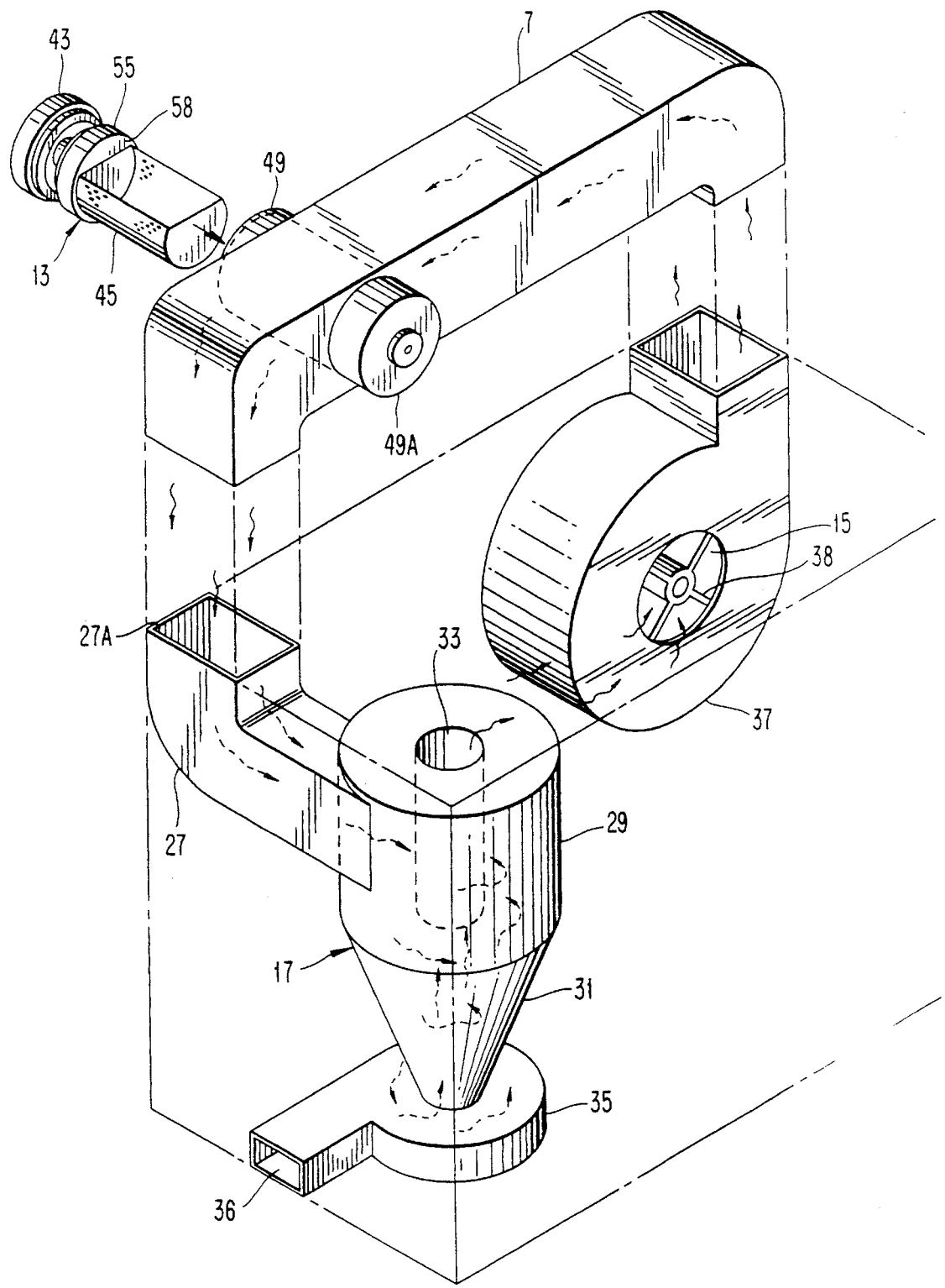
FIG. 2F is a partial view of the closed-loop air duct assembly used to circulate air through the closed-loop air heating system, the top cover of the closed-loop air heating system being removed for purposes of illustration.

As shown in FIG. 2F, the closed-loop air heating system includes a rotary fan blade assembly 38 which is interposed in the closed-loop air heating system to force the circulation of air. Still further, the closed-loop air heating system includes a cyclone separator device 17 which is connected to the air duct assembly 7 via a cyclone transition duct 27, for removing particulates from the circulating air stream.

The rotary fan blade assembly 38 shown in FIG. 2F includes a shroud 37 and a fan 15. The fan 15 is interposed in a section of the closed-loop system between a separator outlet member 33, formed as an outlet tube within the separator 17, and the air duct section 7 which receives the rotary heating basket assembly 13. In operation, the fan 15 receives cleaned air from the separator outlet member 33 through the sealed closed-loop air heating system, and then drives that air through the air duct section 7 which includes the basket assembly 13.

In the embodiment shown in FIG. 2F, the separator device 17 includes an inlet member 27 with an inlet opening 27A, a generally cylindrical body member 29 that receives air from the inlet member, and a frustro-conical member 31 that connects to the lower periphery of the cylindrical body member 29. The inlet member 27 is tangentially connected to an exterior perimeter of the cylindrical body member 29. Air forced into the inlet opening 27 is thereby directed toward one side of the separator outlet member 33 in a downward swirling pattern about the separator outlet member 33. Further, turning vanes 28 (FIG. 3) in the inlet member 27 assist in directing air into the cylindrical body member 29 in the swirling air stream pattern illustrated in FIG. 2F.

The cylindrically-shaped separator outlet member 33 of separator 17 discharges cleaned air from a lower interior portion of the cylindrical body member 29 of the cyclone separator into the closed-loop air heating system. The flowing air stream, with particulates removed, is discharged from the separator device 17 via the outlet member 33 for re-entry into the inlet of the fan 15. In practice, the cyclone separator is made from stainless steel metal as is the entire interior of the closed-loop air heating system.

The separator device 17, generally speaking, operates to remove contaminants from the air stream that circulate within the closed-loop air heating system. Typically, the contaminants are oil vapor, water, potato crumbs, and carbonized particulates that are introduced into the heated air stream as it passes through the rotary heating basket assembly 13. Thus, the separator device 17 (in conjunction with the air exchange system) prevents particulate contaminants from being carried by the air stream back through an electrical heater 19 (FIG. 4) of the closed-loop air heating system, where the contaminants might create burning or smoking odors.

As illustrated in FIG. 2F, during operation of the separator device 17, the centrifugal force of the air circling tangentially around the outlet member 33 in the cylindrical body member 29 causes entrained particulates to be accelerated radially outward to the perimeter of the air stream. The entrained particulates thereby impinge upon an interior peripheral wall of the cylindrical body member 29 and are separated from the main air stream as it spirals down the separator wall. The turning vanes in the inlet member 27 assist in establishing a laminar flow entering tangentially into the cylindrical body member 29. The particulates carried by the spiraling air mass enter the frustro-conical member 31 via gravity discharge where the downward decreasing cross-sectional radius causes an increase in radial acceleration of the relatively heavier fraction of materials (i.e., particulates in the air stream), while turning the lighter air back upwards where it is drawn through outlet member 33.

Preferably, a secondary clean-out scroll 35 is mounted at the bottom of the frusto-conical member 31 of the separator. In operation, the air stream expands rapidly into the enlarged radius of the clean-out scroll 35 such that particulates in the air stream thereby lose velocity and drop out of the air stream. In practice, the collected particulates are periodically removed from the clean-out scroll 35 via a discharge outlet 36.

The separator device 17 also provides a thermal mass that can absorb heat from, or can provide heat to, the circulating air stream. In the later case, the separator device 17 provides a heat reservoir that can act as a source of nearly instantaneous thermal energy. The walls of the separator device receive heat by radiant absorption from the heating elements and from the circulating air mass. the centrifugal separator thereby provides radiant heating of the air mass circulating through the system and, as such, serves as a heat sink.

In practice, the separator device 17 can supply a substantial portion of the required heat when batches of frozen food products are heated fairly frequently. This allows frozen food products to be heated rapidly—because pre-heating time is not required. For example, batches of french fried potatoes are periodically heated in the closed-loop air heating system with a frequency such as every thirty five seconds. If the separator device were not available as a source of thermal energy, the heating cycles would not be as frequent or, alternatively, a larger capacity electrical heater would have to be provided for heating the circulating air.

Not only does the separator device 17 provide a source of nearly instantaneous thermal energy but, in addition, the body of the separator device becomes sufficiently hot to burn oil vapors that are carried by the air stream circulating within the closed-loop system. More particularly, when the vapors impinge upon the wall of the separator device, the burnt vapors form a solid residue on the housing wall. As a result, the oil vapors are effectively removed from the circulating air stream, allowing the system to produce heated food products, such as french fried potatoes, without undue external oiliness while precluding a build up of oil in the air stream.

Also because the separator device 17 is maintained at heating temperatures, it acts as a plating device to take oil out of the airstream. More particularly, plate-out of oil vapor builds inside of the cylindrical body member 29 until the plated solids are removed during a self-cleaning process. At the high temperatures that are generated during self-cleaning, the plated-out solids break off, flake off, or are burned off the walls of the separator body. The net result is that the oil vapors are removed from the airstream.

Figure 4:
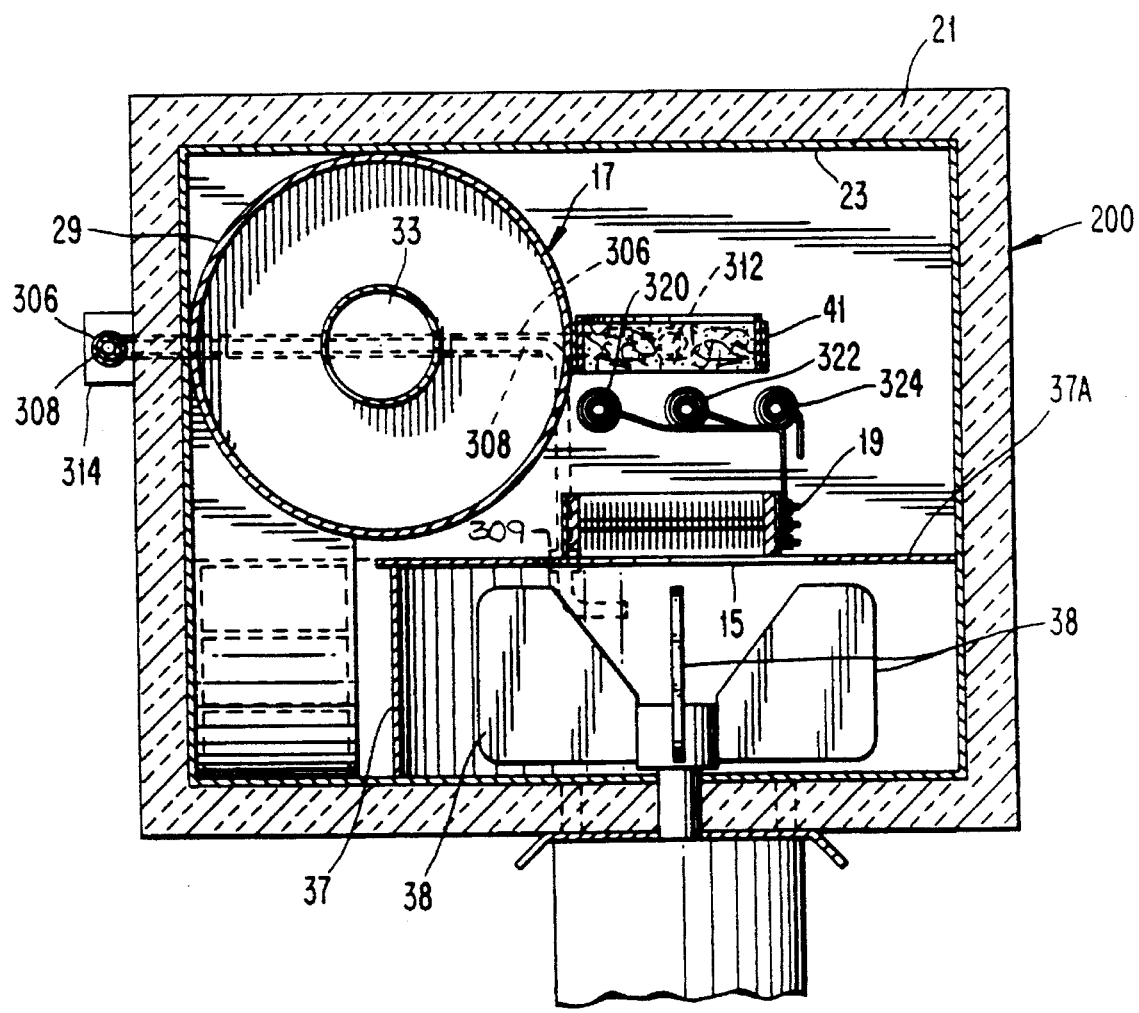
FIG. 4 is a partial view in the direction of sectional lines 4—4 in FIG. 3 for viewing a location of a heater in the air stream between a separator and a fan unit.

FIG. 3 shows a right hand side view of the FIG. 2F closed-loop air heating system 200 with an exterior insulating cover removed. FIG. 4 shows an upper portion of the closed-loop air heating system when viewed in the direction of sectional lines 4—4 in FIG. 3.

From the view of FIG. 4, the closed-loop air heating system can be seen to include the electrical heater 19, mounted in communication with the inlet of fan 15 for heating the circulating air stream. A housing 23 surrounds the air duct assembly and supports insulation material 21.

In an exemplary embodiment, the electrical heating elements of the heater 19 are mounted in a low pressure area of the closed-loop air heating system in front of the inlet to fan 15. For example, the heater 19 can be mounted to an exterior of the separator device 17 as shown in FIG. 4. The outlet of the fan is connected to the air duct section 7 as shown in FIGS. 2F and 3. The purpose of mounting the heater near the fan inlet is to provide uniform mixing of the heated air stream before the air stream encounters the rotary heating basket assembly 13. This is done to enhance the uniformity with which food is heated by the heating system.

Referring to FIG. 3, three encased wires 320, 322 and 324 are connected to the heater 19 to provide, for example, three temperature settings associated with three current settings (e.g., a low stand-by heat 3 amp setting, a normal heat 6 amp setting, and a self-cleaning 9 amp setting). In normal operation, the heater 19 heats the circulating air stream to approximately 455° F. to 465° F.

The heater 19, however, preferably has sufficient additional capacity to elevate the temperature of the circulating air stream to approximately 855° F. This capability allows the closed-loop air heating system to be self-cleaning. Further, the heater 19 includes a low, stand-by temperature setting which is automatically cycled off or on when a vend operation or a self-cleaning operation has not been initiated and the heat loss of the system does not require additional heat to maintain set point temperature.

In operation, the heater 19 is controlled by an on board computer which senses the temperature via a thermocouple 319 mounted in air duct section 7 (FIG. 3). A second thermocouple 319 can be provided for calibration. A low pressure air flow side of the heater further includes a catalytic converter 41 (FIG. 4) which is self-activated (e.g., at 650° F.) during the cleaning cycle to burn off particulate in the air flow.

FIGS. 3–4 illustrate the interior ventilation portion of the air exchange means in greater detail. As can be seen in the side view of FIG. 3, the intake tubes 306 and 308, respectively enter through the insulation side panel into a void at the junction of the air duct section 7 and the closed-loop air heating system which includes the inlet of fan 15. The intake tube 306 turns vertically down and is attached to the fitting 312 for introducing fresh air into the closed-loop air heating system. The fitting 312 connects the intake tube 306 to an interior housing of the closed-loop air heating system just above the suction side of the fan 15 (see the hashed line illustration of intake tube 306 in FIG. 4). Fresh air is then drawn by the fan 15 from outside the closed-loop air heating system through tube 306 and into the heater 19 of the closed-loop air heating system.

The exemplary exhaust tube 308 can be seen in FIG. 3 to actually include two segments: 1) a first segment which connects the air exchange condensation clean-out 314 to an exterior of the closed-loop air heating system and 2) a second segment which connects the air exchange condensation clean-out box 314 to an interior of the air duct assembly 7 of the closed-loop air heating system.

The segment of the exhaust tube 308 which connects clean-out box 314 to an interior of air duct section 7 is illustrated in FIG. 3. This segment of the exhaust tube 308 is also superimposed over the fan 15 in the top sectional view of FIG. 4 using hashed lines.

By breaking the exhaust tube 308 into two segments, any oil vapor (from heated product) included in the air drawn from the interior of the closed-loop air heating system is collected on the interior of the sealed clean-out box 314 or on the tray 316 of the clean-out box 314. The air then flows from the air exchange clean-out to the pre-filter 310A (FIG. 1A). The clean-out condenses oil vapor from the air and greatly reduces the amount of oil which could otherwise plate out and plug the air exhaust tube downstream as the air in the tube gets cooler.

As shown in FIGS. 3 and 4, the exhaust tube 308 enters the positive (i.e., high) pressure air duct section 7 (connected to the outlet of fan 15 in the closed-loop air heating system) via an elbow joint 309. All open end of the exhaust tube is positioned in the closed-loop air duct section 7 to collect air flowing from the fan 15. Thus, fresh air is introduced on a low pressure side of the fan 15, while air is removed from the high pressure side of the fan 15.

Overall operation of the FIG. 1A apparatus will now be described. Initially, upon activation of a vending operation (e.g., upon deposit of appropriate currency/coinage), the lower basket portion of the basket assembly and drive 12 is withdrawn from the air stream of the closed-loop air heating system (i.e., from the cooker seal tube 49 in FIG. 2A). The freezer trap door of the freezer 102 is opened, and a serving of frozen french fries in the weigh scale bucket of the weighing means 112 is emptied into the lower basket portion. The lower basket portion is then immediately reintroduced into its "in" position within the closed-loop air duct section 7, and mated with the basket cover retained therein. The freezer door is closed, and the weigh scale bucket is immediately refilled with another serving of frozen french fries.

The lower basket portion has now been filled with a pre-measured portion of a frozen food product and the lower basket portion 45 and the cover assembly 47 have been mated together as shown in FIG. 2A to form a cylindrical enclosure within the closed-loop air duct section 7. The rotary heating basket assembly is then rotated in the heated air stream for a predetermined time period to uniformly expose the food to the impinging air stream.

In practice, the rotation speed of the heating basket assembly is generally constant (e.g., twenty revolutions per minute). Also in practice, the air velocity impinging upon the food during the heating cycle is controlled at about 2200 ft/min with a volumetric flow rate of about 378 cubic feet per minute (cfm) at about 455° to 465° F. to promote rapid heating without smoking.

At the air velocity of about 2200 ft/min, it has been found that french fried potatoes will cook to have delicate and crisp outer layers with moist hot interiors. In practice, it also has been found that the air velocity of about 2200 ft/min is sufficient to entrain loose oil from the fried potatoes during heating, leaving the heated product essentially dry to the touch.

After the heating cycle is completed and the basket has returned to the upright position (i.e., open part of the lower basket portion faces up), the lower basket portion is withdrawn from the closed-loop air duct section 7 to its "out" position. As lower basket portion 45 is removed, the basket cover assembly remains attached within the air duct section 7.

After the lower basket portion is withdrawn to its "out" position, the basket is rotated one full rotation to return to the upright position. Upon passing through the inverted position, the heated food product is discharged into a dispensing cup or the like which is dispensed via a chute 401 from a cup dispenser 402 in the FIG. 1A door unit 400. When the FIG. 1A door unit is moved to its closed position (i.e., the right hand side of FIG. 1A), the cup filled with heated french fries is accessed by a customer via an opening 404 in the door unit 400. After the lower basket portion is in its non-inverted position, it can be loaded with another serving portion of pre-frozen food product. Alternatively, if an additional vending operation has not been immediately requested, the lower basket portion is re-inserted into the closed-loop air duct section 7.

In typical operation of the system, the fan 15 is operated between heating cycles to keep air circulating within the system. Also in typical operation of the system, sufficient electrical current is provided to heater 19 such that the temperature of the circulating air is maintained at the heating temperature (i.e., approximately 450° F.). When the lower basket portion is filled with a serving portion of frozen food and is rotated in the heated air stream, the separator means provides a thermal mass that provides a portion of the heat to the circulating air stream to thereby minimize the heating time.

The above-described closed-loop air heating system obviates the need for a hot oil reservoir and its attendant difficulties. As such, the heating system delivers french fried potatoes that have tender but crisp exteriors, uniformly hot interiors that taste like baked potatoes. Moreover, the french fried potatoes have a uniform and pleasing color, and very little external oiliness.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An apparatus for dispensing a predetermined quantity of a product comprising:

a means for storing the product to be dispensed;

a weighing means for weighing a metered portion of the product to be dispensed;

an auger for dispensing metered portions of the product from the product storing means into the weighing means; and a trap door drive assembly for opening a trap door of said product dispensing apparatus and for dispensing said metered portion of product from said weighing means, wherein said trap door and said trap door drive assembly are formed as a unitized frame and hardware assembly which is mounted to said product storing means to maintain a fixed relationship between said trap door drive assembly and a trap door opening of said product storing means through which product is dispensed from said product storing means to said weighing means.

2. An apparatus according to claim 1, wherein said auger is a helix auger which further includes:

a number of coiled turns which extend across a length of the helix auger, with a number of flights per inch being reduced at one end of the helix auger; and a tubular insert which runs through a center of the helix auger and is coaxial with the coiled turns.

3. An apparatus according to claim 2 wherein said product storing means further includes:

a sloped side wall for limiting an amount of product which can rest on said auger.

4. An apparatus according to claim 2, wherein said product storing means further includes:

a sloped wall for covering at least some of said coiled turns to prevent product included in said product storing means from resting on said at least some of said coiled turns, while leaving remaining ones of said coil turns exposed to product within said product storing means, the number of flights per inch of said helix auger exposed to said product being greater than the number of flights per inch of said coiled turns covered by said sloped wall.

5. An apparatus according to claim 1, wherein said trap door drive assembly simultaneously opens said trap door and tips a weigh scale of said weighing means to dispense the product from the weigh scale, said apparatus further including:

an offset cam and linkage operatively connected between a trap door drive motor and said trap door to move said trap door approximately vertically during an initial range of movement, and to move said trap door horizontally during a subsequent range of movement.

6. An apparatus according to claim 5, wherein said trap door drive assembly further includes:

at least one cam operated switch for controlling operation of said trap door drive motor based on a position of said trap door.

7. An apparatus according to claim 5, wherein said trap door drive assembly further includes:

two guide arms, each guide arm having a roller bearing cam follower and a guide pin, roller bearings of said roller bearing cam follower being included within guide paths of a support frame to cause vertical camming of the trap door during said initial range of movement and to carry the trap door horizontally during said subsequent range of movement.

8. An apparatus according to claim 7, wherein said trap door drive assembly further includes:

an adjustable linkage for controlling a length of horizontal travel during said subsequent range of movement.

9. An apparatus according to claim 1 wherein said product storing means includes:

a freezer and hopper for storing the product at a predetermined temperature.

10. An apparatus according to claim 1 wherein said product storing means further includes:

a sloped side wall for limiting an amount of product which can rest on said auger.

11. An apparatus according to claim 1, wherein said trap door drive assembly further includes:

an attachment for attaching said trap door drive assembly to a weigh scale bucket of said weighing means such that said trap door drive assembly simultaneously opens said trap door and tips said weigh scale bucket to dispense the product from said weigh scale bucket through a trap door opening.

12. An apparatus according to claim 1, wherein said weighing means further includes:

a weigh scale bucket which pivots about a weigh scale pivot arm such that a center of gravity of product loaded into said weigh scale bucket is maintained at a uniform moment at arms length relative to a balance point of the weigh scale pivot arm regardless of product displacement within said weigh scale bucket.

13. An apparatus according to claim 1, wherein said product storing means further includes:

a sloped wall for covering at least some of said coiled turns to prevent product included in said product storing means from resting on said at least some of said coiled turns, while leaving remaining ones of said coil turns exposed to product within said product storing means, the number of flights per inch of said helix auger exposed to said product being greater than the number of flights per inch of said coiled turns covered by said sloped wall.

14. An apparatus for dispensing a predetermined quantity of a product comprising:

a means for storing the product to be dispensed;

a weighing means for weighing a metered portion of the product to be dispensed;

an auger for dispensing metered portions of the product from the product storing means into the weighing means; and a trap door drive assembly for opening a trap door of said product dispensing apparatus and for dispensing said metered portion of product from said weighing means, wherein said trap door drive assembly further includes:

an attachment for attaching said trap door drive assembly to a weigh scale bucket of said weighing means such that said trap door drive assembly simultaneously opens said trap door and tips said weigh scale bucket to dispense the product from said weigh scale bucket through a trap door opening.

15. An apparatus according to claim 14 further comprising:

a detector for sensing when a predetermined amount of the product has been stored in said weigh scale bucket, rotation of said auger being controlled in response to an output of said detector.

16. An apparatus according to claim 15, further including:

time-out means for discontinuing operation of said auger when said product storing means is determined to be empty.

17. An apparatus according to claim 14, wherein said auger is a helix auger which further includes:

a number of coiled turns which extend across a length of the helix auger, with a number of flights per inch being reduced at one end of the helix auger; and a tubular insert which runs through a center of the helix auger and is coaxial with the coiled turns.

18. An apparatus according to claim 14, wherein said trap door drive assembly simultaneously opens said trap door and tips a weigh scale of said weighing means to dispense the product from the weigh scale, said apparatus further including:

an offset cam and linkage operatively connected between a trap door drive motor and said trap door to move said trap door approximately vertically during an initial range of movement, and to move said trap door horizontally during a subsequent range of movement.

19. An apparatus according to claim 14, wherein said product storing means includes:

a freezer and hopper for storing the product at a predetermined temperature.

20. An apparatus according to claim 14, wherein said product storing means further includes:

a sloped side wall for limiting an amount of product which can rest on said auger.

21. An apparatus according to claim 14, wherein said weighing means further includes:

a weigh scale bucket which pivots about a weigh scale pivot arm such that a center of gravity of product loaded into said weigh scale bucket is maintained at a uniform moment at arms length relative to a balance point of the weigh scale pivot arm regardless of product displacement within said weigh scale bucket.

22. An apparatus according to claim 14, wherein said product storing means further includes:

a sloped wall for covering at least some of said coiled turns to prevent product included in said product storing means from resting on said at least some of said coiled turns, while leaving remaining ones of said coil turns exposed to product within said product storing means, the number of flights per inch of said helix auger exposed to said product being greater than the number of flights per inch of said coiled turns covered by said sloped wall.

23. An apparatus according to claim 14, wherein said trap door and said trap door drive assembly are formed as a unitized frame and hardware assembly which is mounted to said product storing means to maintain a fixed relationship between said trap door drive assembly and a trap door opening of said product storing means through which product is dispensed from said product storing means to said weighing means.

24. An apparatus for dispensing a predetermined quantity of a product comprising:

a means for storing the product to be dispensed;

a weighing means for weighing a metered portion of the product to be dispensed;

an auger for dispensing metered portions of the product from the product storing means into the weighing means; and a trap door drive assembly for opening a trap door of said product dispensing apparatus and for dispensing said metered portion of product from said weighing means, wherein said weighing means further includes:

a weigh scale bucket which pivots about a weigh scale pivot arm such that a center of gravity of product loaded into said weigh scale bucket is maintained at a uniform moment at arms length relative to a balance point of the weigh scale pivot arm regardless of product displacement within said weigh scale bucket.

25. An apparatus according to claim 24, further including:

a weigh scale chute in which said weigh scale bucket nests when said weigh scale pivot arm becomes unbalanced.

26. An apparatus according to claim 25, further comprising:

a proximity sensor for detecting an unbalanced condition of said weigh scale pivot arm for signaling a controller to deactivate rotation of said auger.

27. An apparatus according to claim 24, wherein said auger is a helix auger which further includes:

number of coiled turns which extend across a length of the helix auger, with a number of flights per inch being reduced at one end of the helix auger; and a tubular insert which runs through a center of the helix auger and is coaxial with the coiled turns.

28. An apparatus according to claim 24, wherein said trap door drive assembly simultaneously opens said trap door and tips a weigh scale of said weighing means to dispense the product from the weigh scale, said apparatus further including:

an offset cam and linkage operatively connected between a trap door drive motor and said trap door to move said trap door approximately vertically during an initial range of movement, and to move said trap door horizontally during a subsequent range of movement.

29. An apparatus according to claim 24, wherein said product storing means includes:

a freezer and hopper for storing the product at a predetermined temperature.

30. An apparatus according to claim 24, wherein said product storing means further includes:

a sloped side wall for limiting an amount of product which can rest on said auger.

31. An apparatus according to claim 24, wherein said trap door and said trap door drive assembly are formed as a unitized frame and hardware assembly which is mounted to said product storing means to maintain a fixed relationship between said trap door drive assembly and a trap door opening of said product storing means through which product is dispensed from said product storing means to said weighing means.

32. An apparatus for dispensing a predetermined quantity of a product comprising:

a means for storing the product to be dispensed;

a weighing means for weighing a metered portion of the product to be dispensed;

an auger for dispensing metered portions of the product from the product storing means into the weighing means; and a trap door drive assembly for opening a trap door of said product dispensing apparatus and for dispensing said metered portion of product from said weighing means, wherein said product storing means further includes:

a sloped wall for covering at least some of said coiled turns to prevent product included in said product storing means from resting on said at least some of said coiled turns, while leaving remaining ones of said coil turns exposed to product within said product storing means, the number of flights per inch of said helix auger exposed to said product being greater than the number of flights per inch of said coiled turns covered by said sloped wall.

33. An apparatus according to claim 32, wherein said auger is a helix auger which further includes:

a number of coiled turns which extend across a length of the helix auger, with a number of flights per inch being reduced at one end of the helix auger; and a tubular insert which runs through a center of the helix auger and is coaxial with the coiled turns.

34. An apparatus according to claim 32, wherein said trap door drive assembly simultaneously opens said trap door and tips a weigh scale of said weighing means to dispense the product from the weigh scale, said apparatus further including:

an offset cam and linkage operatively connected between a trap door drive motor and said trap door to move said trap door approximately vertically during an initial range of movement, and to move said trap door horizontally during a subsequent range of movement.

35. An apparatus according to claim 32, wherein said product storing means includes:

a freezer and hopper for storing the product at a predetermined temperature.

36. An apparatus according to claim 32, wherein said product storing means further includes:

a sloped side wall for limiting an amount of product which can rest on said auger.

37. An apparatus according to claim 32, wherein said weighing means further includes:

a weigh scale bucket which pivots about a weigh scale pivot arm such that a center of gravity of product loaded into said weigh scale bucket is maintained at a uniform moment at arms length relative to a balance point of the weigh scale pivot arm regardless of product displacement within said weigh scale bucket.

38. An apparatus according to claim 32, wherein said trap door and said trap door drive assembly are formed as a unitized frame and hardware assembly which is mounted to said product storing means to maintain a fixed relationship between said trap door drive assembly and a trap door opening of said product storing means through which product is dispensed from said product storing means to said weighing means.

* * * * *